United States Patent
Brower

(10) Patent No.: US 11,644,371 B1
(45) Date of Patent: May 9, 2023

(54) SYSTEMS, DEVICES AND METHODS FOR MONITORING SUPPORT PLATFORM STRUCTURAL CONDITIONS

(71) Applicant: Astro Technology Group, LLC, Houston, TX (US)

(72) Inventor: David Verl Brower, Houston, TX (US)

(73) Assignee: ASTRO TECHNOLOGY GROUP, LLC, Houston, TX (US)

( * ) Notice: Subject to any disclaimer, the term of this patent is extended or adjusted under 35 U.S.C. 154(b) by 0 days.

(21) Appl. No.: 17/843,805

(22) Filed: Jun. 17, 2022

Related U.S. Application Data

(63) Continuation of application No. 17/571,472, filed on Jan. 8, 2022, now Pat. No. 11,422,047.

(51) Int. Cl.
| | |
|---|---|
| *G01L 1/24* | (2006.01) |
| *B63B 35/44* | (2006.01) |
| *B63B 21/50* | (2006.01) |
| *E21B 47/001* | (2012.01) |
| *E21B 47/007* | (2012.01) |
| *E21B 47/135* | (2012.01) |

(52) U.S. Cl.
CPC .......... *G01L 1/246* (2013.01); *B63B 35/4413* (2013.01); *B63B 21/502* (2013.01); *E21B 47/001* (2020.05); *E21B 47/007* (2020.05); *E21B 47/135* (2020.05)

(58) Field of Classification Search
CPC ... G01L 1/246; B63B 35/4413; B63B 21/502; E21B 47/007; E21B 47/001; E21B 47/135

USPC .......................................................... 356/32
See application file for complete search history.

(56) References Cited

U.S. PATENT DOCUMENTS

| | | | |
|---|---|---|---|
| 4,640,139 A * | 2/1987 | Fritz .................... | G01L 5/1627 702/42 |
| 5,590,982 A | 1/1997 | Huete | |
| 5,964,550 A | 10/1999 | Blandford et al. | |
| 7,447,614 B2 * | 11/2008 | Ghaboussi ............ | G05B 17/02 703/2 |
| 7,520,176 B1 * | 4/2009 | Ko ...................... | G01M 5/0016 73/800 |
| 8,127,801 B2 | 3/2012 | Brower | |

(Continued)

*Primary Examiner* — Matthew R Buck
*Assistant Examiner* — Patrick F Lambe
(74) *Attorney, Agent, or Firm* — David O. Simmons; IVC Patent Agency

(57) ABSTRACT

Systems, devices and methods enable generation and monitoring of support platform structural conditions in a manner that overcomes drawbacks associated with conventional approaches (e.g., load cells) for generating and monitoring similar operating condition information. In preferred embodiments, such systems, devices and methods utilize fiber optic strain gauges (i.e., fiber optic sensors) in place of (e.g., retrofit/data replacement) or in combination with conventional load cells. The fiber optic sensors are strategically placed at a plurality of locations on one or more support bodies of a support platform. In preferred embodiments, the fiber optic strain gauges are placed in positions within a hull and/or one or more pontoons of an offshore platform. Such positions are selected whereby resulting operating condition data generated by the fiber optic strain gauges suitably replaces data received by conventionally constructed and located load cells of an offshore platform (e.g., a TLP).

17 Claims, 6 Drawing Sheets

(56) References Cited

U.S. PATENT DOCUMENTS

| | | |
|---|---|---|
| 8,612,186 B2 | 12/2013 | Wu et al. |
| 9,573,662 B2 | 2/2017 | Amate-Lopex et al. |
| 9,677,951 B2 | 6/2017 | Li |
| 9,719,309 B2 | 8/2017 | Brower |
| 9,915,579 B1* | 3/2018 | Brower ................. G01L 11/025 |
| 10,031,044 B2 | 7/2018 | Kumar et al. |
| 10,746,016 B2 | 8/2020 | Barry et al. |
| 2004/0206187 A1* | 10/2004 | Williams ................. E21B 47/01 |
| | | 73/766 |
| 2005/0283276 A1 | 12/2005 | Prescott et al. |
| 2009/0077982 A1 | 3/2009 | Brower |
| 2010/0229662 A1 | 9/2010 | Brower |
| 2011/0219866 A1 | 9/2011 | Brower |
| 2014/0290374 A1 | 10/2014 | Brower |
| 2014/0354974 A1* | 12/2014 | Brower ................... G01L 1/242 |
| | | 356/32 |
| 2014/0354975 A1 | 12/2014 | Brower |
| 2015/0241299 A1* | 8/2015 | Deckers ............. E02B 17/0818 |
| | | 73/786 |
| 2016/0326861 A1* | 11/2016 | Brower ................... E21B 17/01 |
| 2018/0106140 A1* | 4/2018 | Barrilleaux ........... E21B 43/101 |
| 2019/0218738 A1* | 7/2019 | Chang ................... E02B 17/021 |

* cited by examiner

SYSTEMS, DEVICES AND METHODS FOR MONITORING SUPPORT PLATFORM STRUCTURAL CONDITIONS

CROSS-REFERENCE TO RELATED APPLICATIONS

This continuation patent application claims priority from co-pending United States Non-Provisional Patent Application having Ser. No. 17/571,472, filed 8 Jan. 2022, entitled "SYSTEMS, DEVICES AND METHODS FOR MONITORING SUPPORT PLATFORM STRUCTURAL CONDITIONS", having a common applicant herewith and being incorporated herein in its entirety by reference.

FIELD OF THE DISCLOSURE

The disclosures made herein relate generally to monitoring of operating conditions of structural members and, more particularly, to systems, devices and methods for monitoring support (e.g., offshore) platform structural conditions.

BACKGROUND

Structural bodies for which it is necessary to monitor structural conditions thereof are well-known and are used in many industries and applications. Elongated tubular bodies (e.g., pipes) and enclosed tubular bodies (e.g., hulls and pontoons) are examples of structural bodies having with an interior space. Pipes, hulls and pontoons used in offshore drilling and production systems in the oil and gas industry are a prime example of structural bodies for which it is necessary to monitor structural conditions thereof. It is desirable if not essential to monitor parameters such as, for example, stress, strain and temperature of structural bodies, particularly in structural bodies of offshore drilling and production systems.

Offshore drilling and production systems include a work platform at a sea surface (i.e., an offshore platform) that is in communication with a subsurface exploration and/or production site. The offshore platform includes a floatation structure for allowing it to float at the sea surface. Such a floatation structure is well known to often include a hull comprising an enclosed main body (e.g., a columnar shaped body) and a plurality of buoyancy tanks (e.g., pontoons) attached thereto in typically an equally-spaced manner.

A tendon leg platform (TLP) is a specific example of offshore platform having a platform structure for which operating conditions need to be monitored. A TLP, which is typically a permanently positioned structure used for the production of oil and gas in offshore environments, uses a platform structure comprising tendons (i.e., also referred to as tension legs) to support platform elements above the sea surface. TLPs have recently been implemented for use as a base for offshore wind turbines.

TLPs are moored to the seabed by a plurality of tendons each connected to a respective piling that has been driven into the seabed at one end and connected to a respective location of a respective buoyancy tank at the other end (e.g., respective location of a respective pontoon). The tendons of a TLP, which are typically made of tubular steel, maintain the TLP in a generally static position thanks to the balance between thrust forces due to flotation and fastening forces generated by the anchoring elements (tendons and seabed pilings). The tendons restrict vertical motion of the platform that would otherwise occur due to tides and wave action. A major advantage results for TLP structures is that an associated wellhead can be placed on the TLP platform rather than on the sea floor thereby providing better access to the wellhead and more simple production control.

As is well-known, it is desirable to operate drilling and production systems in a safe, reliable, predictable and efficient manner. It is thus beneficial to monitor operating condition information of elongated tubular members of drilling and production systems, such as a TLP. To this end, in a typical TLP installation, a plurality of load cells (i.e., load sensors) are installed into a tendon top connector assembly, which is on a sub-platform or bridge for each tendon. Data from these load cells is used to monitor operating conditions in support bodies of the TLP—e.g., tendons, pontoons, hull or a combination thereof. Specific examples of operating conditions include, but are not limited to, strain and/or stress within one or more walls of a support member, pressure within an interior space of a support member, torsion applied to a support member, temperature of a wall or surface of a support member and the like. In this regard, tendon tensions provide data that enables assessment of loading condition of the TLP; measurement of horizontal center-of-gravity ("COG") and platform weight; determination of platform location (e.g., in a "load triangle"; management of tendon fatigue and the like.

Historically, load cells in offshore applications are becoming less unreliable and often fail during later phases in their service life due to age and possible exposure to seawater and other harsh environmental conditions. Additionally, the load cells offer only limited precision and accuracy in regard to their acquired data. Therefore, systems, devices and methods for enabling generation and monitoring of support platform structural conditions in a manner that overcomes drawbacks associated with conventional approaches for generating and monitoring similar operating condition information would be advantageous, desirable and useful.

SUMMARY OF THE DISCLOSURE

Embodiments of the disclosures made herein are directed to systems, devices and methods for enabling generation and monitoring of support platform structural conditions in a manner that overcomes drawbacks associated with conventional approaches (e.g., load cells) for generating and monitoring similar operating condition of tendon loads and riser strain information. In preferred embodiments, these systems, devices and methods for enabling generation and monitoring of support platform structural conditions utilize fiber optic strain gauges (i.e., fiber optic sensors) in place of (e.g., retrofit/data replacement) or in combination with conventional load cells. The fiber optic sensors are strategically placed at a plurality of locations on one or more support bodies of a support platform. In preferred embodiments, the fiber optic sensors are placed in positions within one or more interior locations such as buoyancy tanks of an offshore platform (e.g., a hull and/or one or more pontoons). Such positions are selected whereby resulting operating condition data generated by the fiber optic strain gauges suitably, if not beneficially, replaces or augments data received by conventionally constructed and located load cells of an offshore platform (e.g., a TLP).

In one or more embodiment of the disclosures made herein, a method of instrumenting an offshore platform for enabling monitoring of structural loadings exerted within elongated bodies mooring the offshore platform to a seabed is provided. The method includes accessing a support member that is within an interior space of a pontoon of the offshore platform and that is fixedly attached to wall portions thereof and attaching a plurality of fiber optic strain gauges to a respective surface of the support member.

In one or more embodiments of the disclosures made herein, a method of enabling instrumentation of a TLP to enable monitoring of structural loadings exerted within tendon legs mooring the TLP to a seabed is provided. The method comprises selecting a support member within an interior space of a pontoon of the TLP for being instrumented to monitor strain therein, performing a structural analysis of the support member and determining strain gauge placement information for each of a plurality of fiber optic strain gauges to be attached to the support member. The structural analysis is performed to determine a strain field profile within the support member resulting from loadings exerted on the pontoon by one or more tendon legs attached thereto. Determining the strain gauge placement information is performed at least partially as a function of the strain field profile. The placement information includes a location of the support member at which a particular one of the fiber optic strain gauges is to be attached.

In one or more embodiments of the disclosures made herein, a TLP comprises a hull and plurality of sets of fiber optic strain gauges. The hull has a main body and a plurality pontoons attached to a lower portion of the main body. Each of the pontoons has a plurality of support members within an interior space thereof that are each fixedly attached to wall portions thereof. Each fiber optic strain gauge of a set is attached to a surface of one of the support members of a respective one of the pontoons. Each fiber optic strain gauge of a set is attached to the surface with a sensing axis thereof oriented one of parallel to, perpendicular to and at an acute angle to a vertical reference axis of the hull.

In one or more embodiments, all of the fiber optic strain gauges are attached to a common surface of the support member and the common surface is a contiguously extending surface.

In one or more embodiments, the contiguously extending surface is a planar surface or a curved surface.

In one or more embodiments, a method further includes performing a structural analysis of the support member to determine a strain field profile within the support member resulting from the support member being subjected to loadings at points of attachment thereof with the wall portions of the pontoon.

In one or more embodiments, a location of the respective surface on which each fiber optic strain gauge is attached and an angular orientation of a sensing axis thereof are both at least partially determined as a function of the strain field profile.

In one or more embodiments, the strain field profile identifies a plurality of strain field regions each exhibiting strain in a respective generalized strain direction relative to a vertical reference axis laying within a planar surface.

In one or more embodiments, attaching each fiber optic strain gauge to a respective surface of the support member includes attaching each of the fiber optic strain gauges to the respective surface within a respective one of the strain field regions with a sensing axis thereof at least approximately aligned with the generalized strain direction of the respective one of the strain field regions.

In one or more embodiments, each fiber optic strain gauge of a first portion of the plurality has a sensing axis thereof extending approximately parallel to the vertical reference axis that lays within a planar surface of the support member, each fiber optic strain gauge of a second portion of the plurality different than the first portion has a sensing axis thereof extending approximately perpendicular to the vertical reference axis and each fiber optic strain gauge of a third portion of the plurality different than the first and second portions has a sensing axis thereof extending at an acute angle relative to the vertical reference axis.

In one or more embodiments, the support member is one of webframe and a bulkhead.

In one or more embodiments, the support member is a webframe located adjacent to a tip tank of the pontoon.

In one or more embodiments, the support member is a webframe located within a water-fillable tip tank of a pontoon.

In one or more embodiments, placement information derived from a structural analysis comprises a planar surface of the support member to which all of the fiber optic strain gauge are attached.

In one or more embodiments, placement information derived from a structural analysis comprises a plurality of strain field regions each exhibiting strain in a respective generalized strain direction relative to a vertical reference axis laying within a planar surface.

In one or more embodiments, the strain field profile identifies a plurality of strain field regions each exhibiting strain in a respective generalized direction relative to a vertical reference axis laying within the planar surface.

In one or more embodiments, each fiber optic strain gauge of each set is positioned at a location of the support members of a respective one of the pontoons in accordance with a strain field profile within the support member resulting from loadings exerted on the pontoon by one or more tendon legs attached thereto.

In one or more embodiment, fiber optic temperature compensation is provided with a separate fiber optic sensor that is isolated from the strain field and only reacts to temperature or is placed at an off angle orientation such as a conventional strain rosette.

These and other objects, embodiments, advantages and/or distinctions of the present invention will become readily apparent upon further review of the following specification, associated drawings and appended claims.

DETAILED DESCRIPTION

Figure 1:
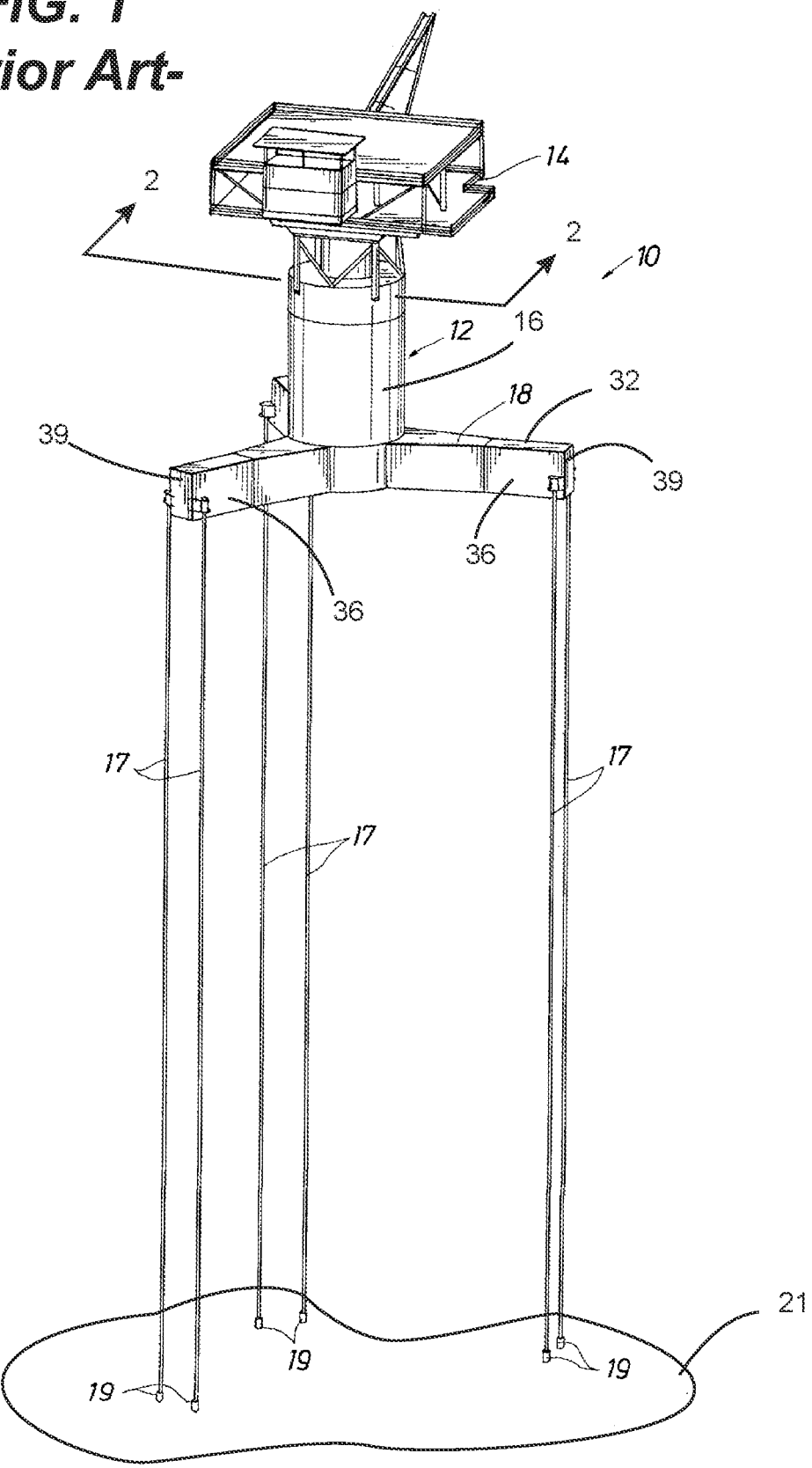
FIG. 1 is a perspective view of a prior art single column tension-leg mooring system.
Figure 2:
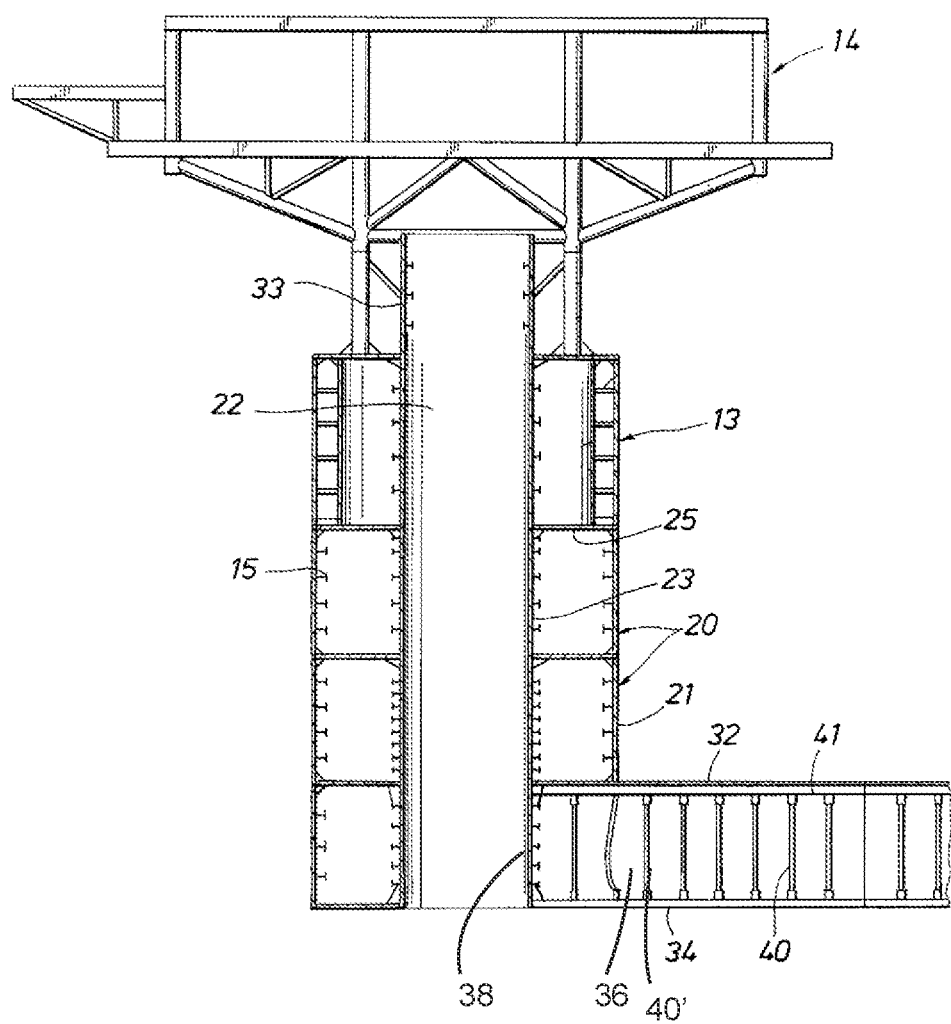
FIG. 2 is a cross-sectional view taken along the line 2-2 in FIG. 1.

A discussion regarding a prior art tendon leg platform (TLP 10) is now set forth in reference to FIGS. 1 and 2, which is generally identified by the reference numeral 10. A SeaStar brand TLP is an example of the TLP 10 shown in FIGS. 1 and 2. Aspects of the SeaStar brand TLP hull design are disclosed in U.S. Pat. No. 5,964,550, which is incorporated herein by reference.

The TLP 10 includes a hull 12 which provides positive buoyancy and vertical support for the TLP 10, including a platform deck structure 14. The platform deck structure 14 may be sized and arranged in accordance with an intended use of the TLP 10—e.g., oil and gas production, oil and gas exploration, wind turbine placement, and the like. The hull 12 may comprise a single column 16 extending upward from a base formed by a plurality of radially extending pontoons 18. In the preferred embodiment of FIG. 1, three pontoons 18 form a base of the hull 12. It is understood however that fewer than or greater three pontoons may be incorporated in the design of a TLP. The pontoons 18 extend radially outward from the longitudinal axis of the hull 12 and are preferably equally spaced from each other. The hull 12 is fabricated in a welded manner from plates, stiffened shell constructions and the like.

The TLP 10 is anchored to a seabed 21 by tendons 17 which are secured to the pontoons 18 at the upper ends thereof and to foundation piles 19 embedded in the seabed 21 at the lower ends thereof. The hull 12 provides sufficient buoyancy to support the platform deck structure 14 as well as equipment/infrastructure thereon and/or attached thereto. Crucially, the hull 12 has sufficient excess buoyancy to develop pre-tension within the tendons 17.

The hull 12 may include a plurality of stacked buoyancy tanks 20. The tanks 20, as best shown in FIG. 2, include an outer wall 21 and an inner wall 23 defining a ballast chamber therebetween. The walls 21 and 23 have top and bottom edges. A top horizontal plate 25 welded to the top edges of the walls 21 and 23 completes the substantially cylindrical structure of the buoyancy tanks 20 which, prior to assembly of the hull 12, are open at the bottom end. Additional structural integrity for the tanks 20 may be provided by stiffener flanges 15 welded to the inner surface of the tank walls 21 and 23. The stiffener flanges 15 may be about three inches in width and one inch thick substantially equally spaced along the walls 21 and 23 of the tanks 20. The buoyancy tanks 20 further include an axial passage extending therethrough, which axial passage is open at each end.

The ballast tanks 20 are stacked one on the other and welded to form the single column of the hull 12. Upon welding one tank 20 on another, the top plate 25 of the lower tank 20 forms the bottom of the tank 20 directly above it. The axial passages extending through the ballast tanks 20 are aligned to form a central axial chamber 22 closed at its lower and upper ends. The chamber 22 is empty and provides internal access to the hull 12. The upper end of the chamber 22 is defined by a cylindrical extension 33 welded to the top of the uppermost tank 20. The extension 33 projects above the uppermost tank 13, providing access to the axial chamber 22 from topside. The chamber 22 and extension 33 additionally house the internal plumbing and valving for the ballast system of the platform 10 which permits the operator to selectively flood or empty the tanks 20 and the pontoons 18.

As shown in FIG. 2, each pontoon 18 includes top and bottom horizontal plates 32 and 34 spaced from each other and connected by opposing sidewalls 36, an internal cylindrical wall 38 and an end wall 39. To optimize the base structure for carrying tendon induced bending moments, the pontoons 18 preferably taper slightly inwardly toward their distal ends. The structural integrity of the pontoons 18, which are the primary load bearing members of the hull 12, is further enhanced by webframes 40 and one or more bulkheads 40'. The webframes 40 and bulkheads 40' are internally welded to the top and bottom plates 32 and 34 and to the sidewalls 36, and are typically equally-spaced internally along the length of a respective one of the pontoons 18. The perimeter of the webframes 40 and bulkheads 40' may have receptacles 43 (e.g., slots) to receive stiffener flanges 41 for reinforcing walls of the pontoons 18.

Turning now to disclosures characterizing the inventive subject matter set forth herein, pontoons of a floating platform are instrumented with fiber optic strain gauges to enable monitoring of loads applied to the pontoons during such floatation. This instrumentation may be implemented during new construction of a platform, refurbishment or repair of a platform, or during use of the platform while at sea. A first benefit to instrumentation in accordance with embodiments of the inventive subject matter is improved measurement attributes (e.g., sensitivity, accuracy and repeatability and the like) relative to convention load cells. A second benefit is improved durability relative to convention load cells (e.g., lifespan of several decades as opposed to several years.)

Figure 3:
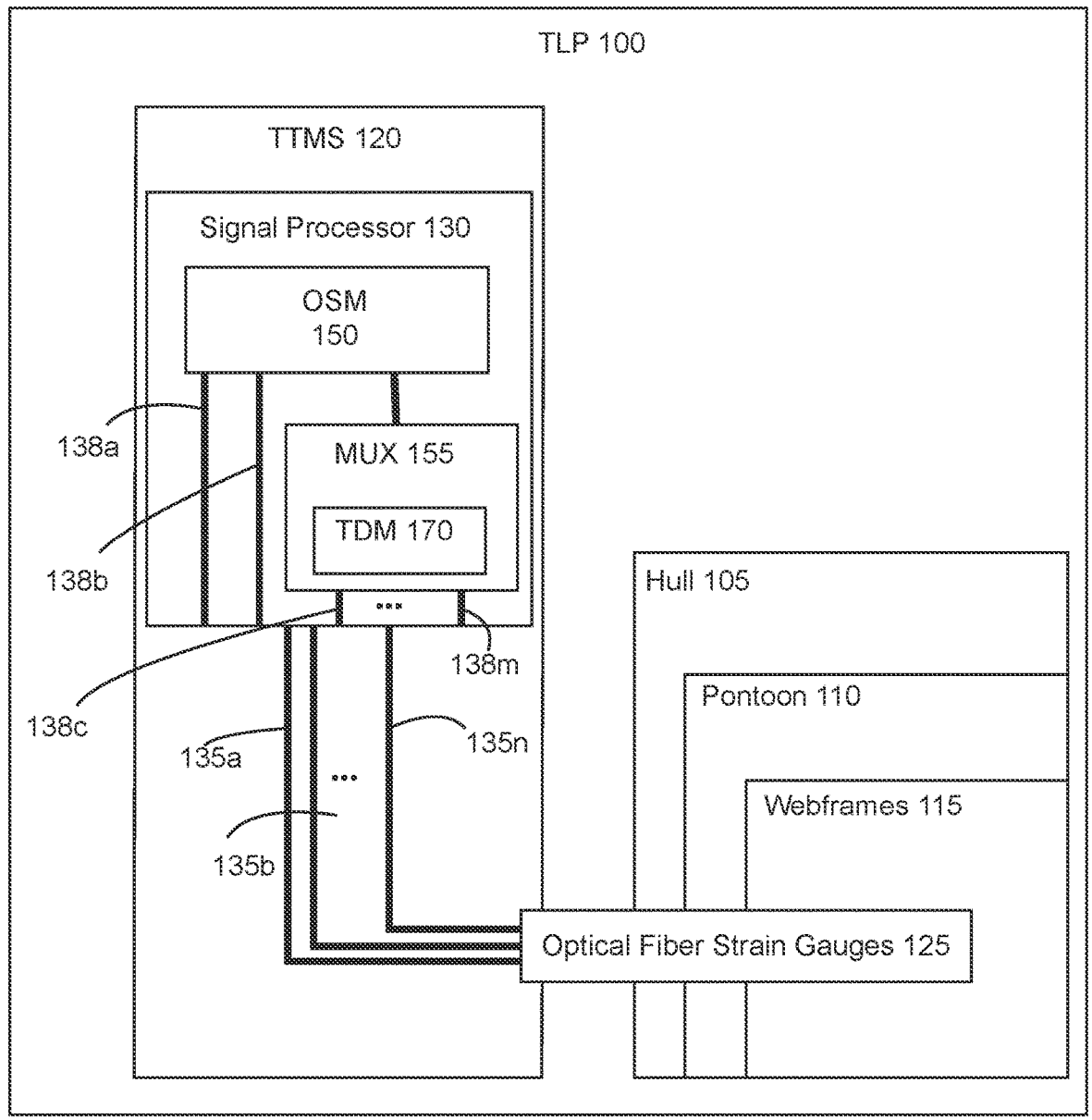
FIG. 3 is a block diagram view of a TLP configured in accordance with one or more embodiment of the inventive disclosures made herein.

Referring now to FIG. 3, a TLP configured in accordance with one or more embodiments of the inventive disclosures made herein (TLP 100) is described. The TLP 100 includes a hull 105 including a plurality of pontoons 110. In this regard, the TLP 100 may have a design substantially the same as the TLP 10 discussed above in reference to FIGS. 1 and 2. Each pontoon 110 includes a plurality of support members 115 (e.g., a plurality of webframes 40 and one or more bulkheads 40'). In one particular implementation, each pontoon 110 has a bulkhead located adjacent a tip portion thereof to create a tip tank at the terminal end portion of the respective pontoon. As is well known in the art, the tip tank is a sealable space in which desired amounts of ballast water may be selectively stored and evacuated.

Figure 4:
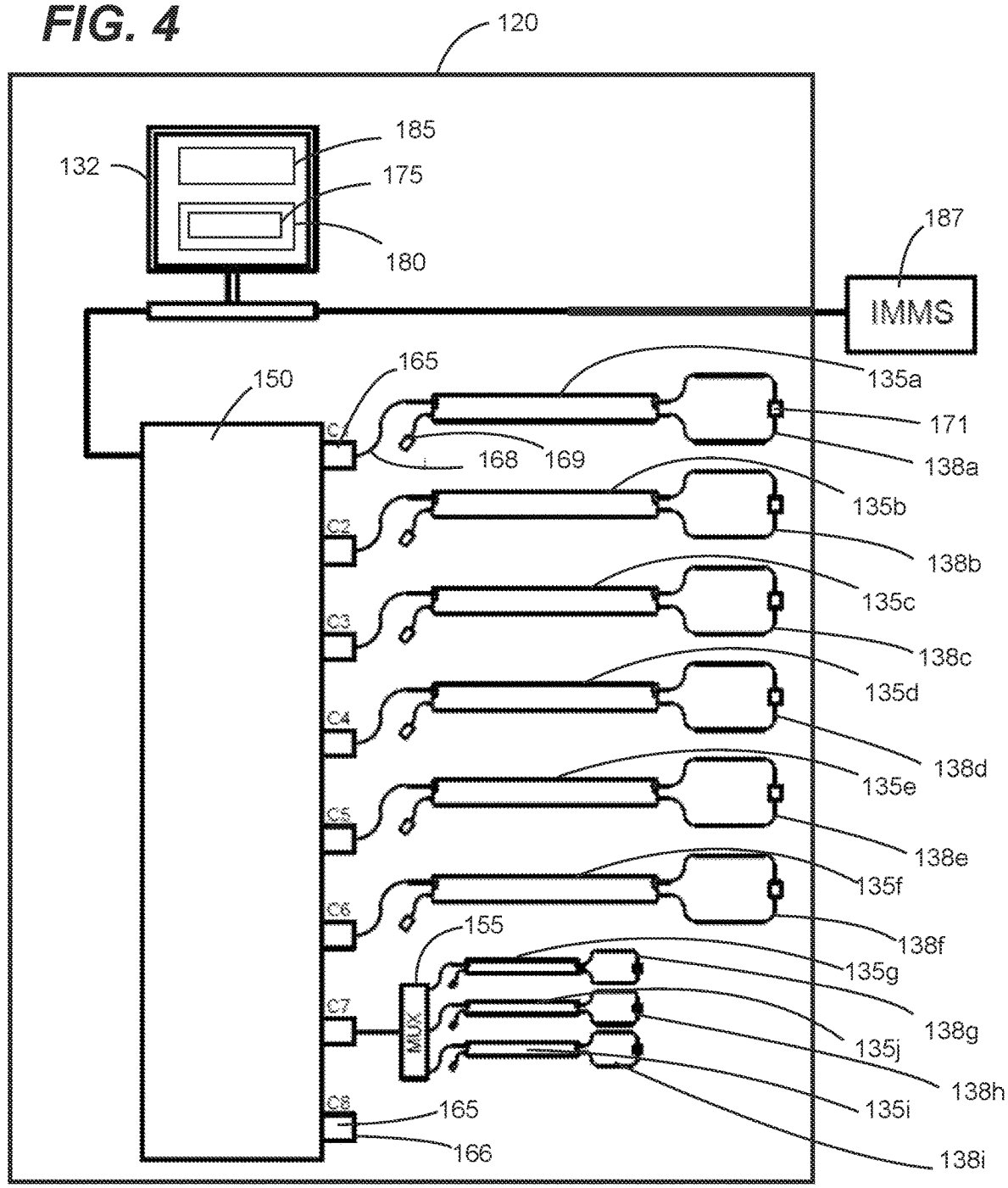
FIG. 4 is a diagrammatic view of a tendon tension monitoring system configured in accordance with one or more embodiment of the inventive disclosures made herein.

As shown in FIG. 3, the TLP 100 includes a tendon tension monitoring system (TTMS) 120. The TMMS 120, as shown in FIGS. 3 and 4, comprising a plurality of optical fiber strain gauges 125, a signal processor 130 and a computer 132. In some embodiments, the signal processor 130 and the computer 132 are the only electrical components of the TTMS 120. Each optical fiber strain gauges 125 is in-line spliced with a respective optical fiber 138*a*-138*m* of a respective one of a plurality of optical fiber cables 135*a*-135*n* (where m=9 (i.e., 138*a*-135*i*) and n=9 (i.e., 135*a*-135*i*) in FIG. 4). Each optical fiber strain gauges 125 is operatively coupled to the signal processor 130 via the corresponding optical fiber 138*a*-138*m* of the respective one of the optical fiber cables 135*a*-135*n*. Such operable coupling enables a signals (light) from the signal processor 130 to be provided to each of the optical fiber strain gauges 125 and for a return signal to be provided from each optical fiber strain gauge 125 to the signal processor 130. These signals are provided over a respective optical fiber 138*a*-138*m* of the respective one of optical fiber cables 135*a*-135*n*.

Each optical fiber strain gauge 125 is attached to a surface of a support member 115 of a respective one of the pontoons 110. In preferred embodiments, each optical fiber strain gauge 125 is attached to a planar surface of a particular support member 115 (e.g., a webframe). The optical fiber strain gauges 125 are each fixedly attached preferably via a rigid bonding technique (e.g., bonding via epoxy) to a support member 115 of a respective one of the pontoons 110. Such fixed attachment of an optical fiber strain gauge 125 to the respective one of the support members 115 enables a strain within a respective one of a plurality of regions R1-R7 of the support member 115 where a particular one of the optical fiber strain gauges 125 is attached to cause a corresponding and proportional elongation of the optical fiber strain gauge 125.

Preferably, the optical fiber strain gauges 125 are arranged as a set, where each optical fiber strain gauge 125 of a set is in-line spliced with a respective one of the optical fibers 138a-138i of a respective one of the optical fiber cables 135a-135n. It is well known that each of the optical fiber cables may include a plurality of optical fibers 138a-138m and that each optical fiber 138a-138m may exit from within an inner and outer jacket of the respective one of the optical fiber cables 135a-135n to permit individual attachment to a strain gauge or a length of optical fiber. For example, in the context of the TLP 100, a particular one of the pontoons 110 may be served by one or more of the optical fiber cables 135a-135n and each support member of the particular one of the pontoons 110 may be served by one or more optical fibers of the one or more optical fiber cables 135a-135n serving the particular pontoon.

In addition to the fiber optic strain gauges 125, one or more temperature sensor may be implemented for providing operating condition information through which temperature of a space within which fiber optic strain gauges are located (e.g., space within a pontoon 110) can be determined. Preferably, the temperature sensor may be in the form of a fiber optic strain gauge that remains unbonded from a support member (i.e., fiber optic temperature gauge). A strain gauge serving as the temperature sensor may be encapsulated in a rigid material (i.e., an epoxy or the like) to protect and rigidize the strain gauge. The temperature compensation may also consist of additional off axis gauges relative to the strain gauge orientation.

Bragg grating, which are well-known to a person of ordinary skill in the art of optical fibers, is a preferred implementation of the strain and temperature gauges disclosed herein. Wavelength for the Bragg gratings may range from about 1200 to about 1700 nanometers with reflectively thereon being generally greater than about 10% and preferably near 70-90%.

In one or more embodiments, the signal processor 130 may comprise an optical sensing module (OSM) 150 and a multiplexing unit (MUX) 155. The OSM 150 is preferably a fiber Bragg grating (FBG) optical interrogator. At least a portion of the optical fibers 138a-138m may be connected directly to a respective signal channel 165 of the OSM 150 or may attached to a signal channel 165 of the OSM 150 through a Time Division Multiplexing (TDM) module 170 of the MUX 155. As is well known in the art, the MUX 155 and TDM module 1 enables a plurality of optical fibers to be selectively connected to a single signal input of the OSM 150, thereby extending optical fiber signaling capacity of the OSM 150.

The OSM 150 sends an emitted light signal along a particular optical fiber connected thereto and thereafter analyzes reflectance (i.e., operating condition) signal generated by each optical fiber strain or temperature gauges of the optical fiber. Each optical fiber strain gauge is configured to interact with a respective different wavelength of the emitted light that is transmitted (i.e., transmitted signal) along the optical fiber. Such interaction generates a corresponding reflectance (i.e., detected) signal that characterizes a changes in the load exhibited within at the respective location of a support member to which an associated strain gauge is attached or temperature of an environment within which an associated strain gauge is located. The OSM 150 converts the detected optical signal to a corresponding (e.g., proportional) electrical signal and provides the electrical signal to the computer 132 via a suitable connection.

As best shown in FIG. 4, the computer 132, which is preferably a server, has a software program 175 (i.e., a computer-readable non-transitory medium) that is accessible from memory 180 of the computer 132 and is executable by one or more processors 185 of the computer 132 thereof. Through analytic assessment of the electrical signals provided to the computer 132 from the OSM 150 (i.e., corresponding to detected optical signals) by the software 175, highly accurate estimates of load levels within one or more tendon legs attached to the respective one of the pontoons 110 and temperature in a particular location thereon can be determined via the software program 175 as a function of strain sensed by one or more associated strain gauges 125. The software program 175 is preferably a custom application developed to perform the functions of the TTMS 120. The computer 132 is preferably remotely accessible through a suitable connection from an integrated marine management system (IMMS) computer 187 through which overall buoyance control of the TLP 100 may be managed.

Still referring to FIG. 4, each of the optical fibers 138a-138m preferably and advantageously include opposing end portions configured for being operably connected to any one of the signal channels 165 of the OSM 150. Additionally, the OSM 120 preferably includes a suitable number of channels to accommodate connection of each optical fiber optical fibers 138a-138m (including via the MUX 155) while at least one of the signal channels 165 remains unused such that it may serve as a spare signal channel 166. In this manner, if a particular one of the optical fibers 138 experiences a break between the end thereof connected to the assigned one of the signal channels 165 (connected end 168) and any of the fiber optic strain gauges thereof, an unconnected end 169 of the particular one of the optical fibers 138 may be connected to the spare signal channel 166 to enable signal transmission for fiber optic strain gauges on the otherwise inaccessible side of the break. To this end, each of the optical fibers 138a-138m is preferably in the form of a loop comprising two optical fibers of a respective optical fiber cable having adjacent end portions thereof at a distal end portion of the respective optic fiber cable thereof (i.e., end remotely located relative to the OSM 150) connected together via a connection 171 (e.g., via a physical connector, fusion splicing or the like).

TTMS functionality as disclosed herein is exceptionally valuable in the case of a TLP having optical fiber strain gauges as an original equipment installation or optical fiber strain gauges as a retro-fitted installation. For example, in the case of a TLP with one or more failed originally-installed load cells, an optical fiber strain gauge implementation as disclosed herein can be installed for enabling monitoring of tendon leg loadings. Where one or more originally-installed load cells remain operational, load information therefrom may be used for establishing and validating a correlation function and/or calibration function (i.e., stress as a function of measured strain) for the installed optical fiber strain gauges.

Figure 5:
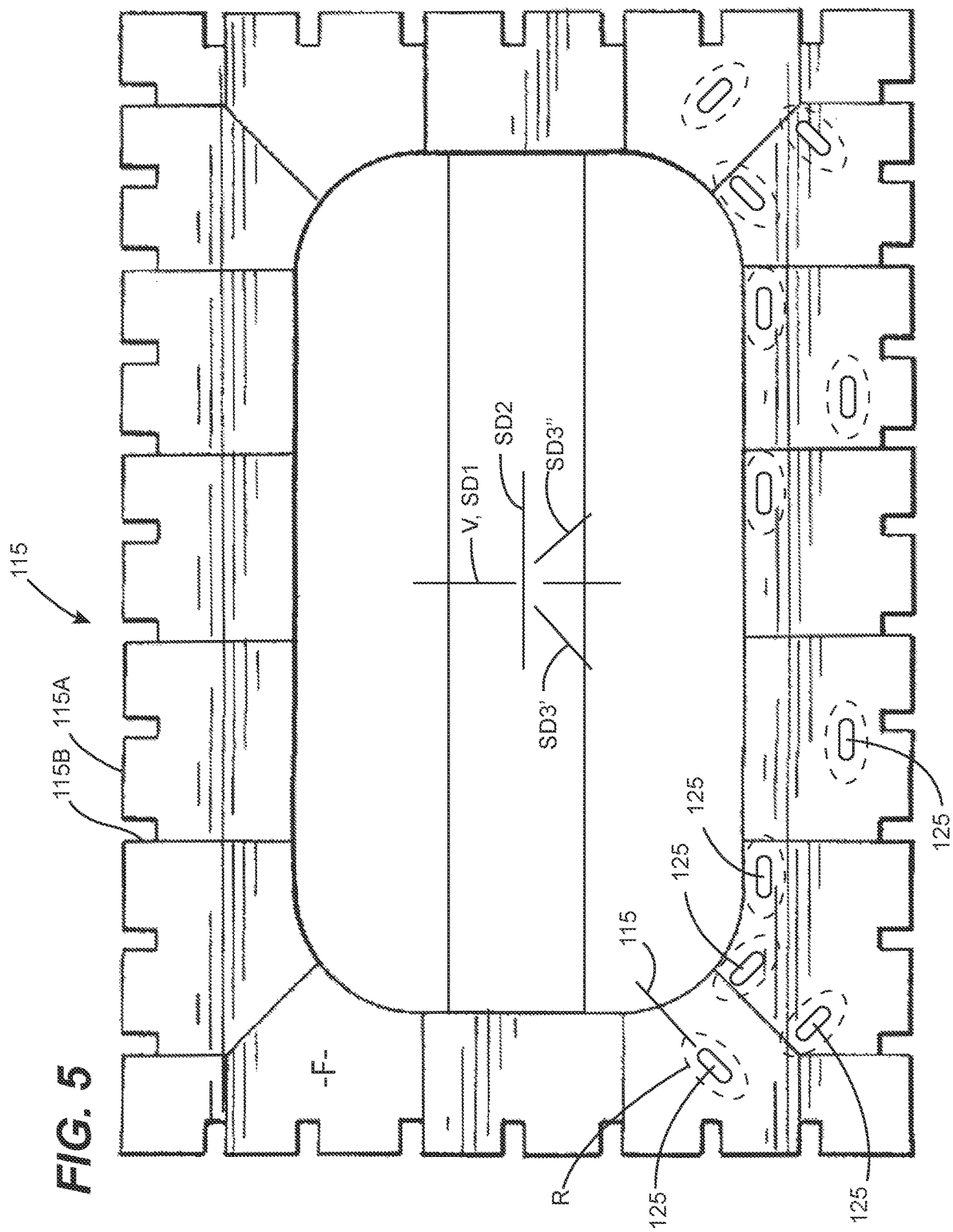
FIG. 5 is a plan view showing a support member instrumented with a plurality of fiber optic strain gauges.

FIG. 5 shows a support member 115 instrumented with a plurality of which fiber optic strain gauges 125 (for clarity, associated optical fiber is not shown). Each of the fiber optic strain gauges 125 is fixedly attached (e.g., bonded with an adhesive such as epoxy) to the support member 115 at a respective location on a face F of the support member 115 and with a sensing axis SA thereof oriented in a manner that are at least partially defined as a function of a strain field profile of the support member 115. The respective location of each fiber optic strain gauge 125 is within a particular region R of the support member 115. The sensing axis SA of each fiber optic strain gauge 125 is at least approximately aligned with a generalized strain direction of the respective strain field region R relative to a centerline vertical reference axis V.

The strain field profile is influenced by characteristics of the particular support member such as shape, thickness, openings extending therethrough, perimeter attachment locations, and the like. For example, in the case of the support member 115 shown in FIG. 5, the strain field profile thereof at least partially results from the particular support member 115 being subjected to loadings exerted at points of attachment of the particular support member 115 with wall portions of the respective one of the pontoons 110—e.g., perimeter edges 115A and/or receptacles 115B which are each typically welded to a mating portion of a respective pontoon 110.

In one or more preferred embodiments, structural analysis of a particular support member (e.g., the support member 115) may be performed to determine a strain field profile within the particular support member. Finite element analysis is an example of such structural analysis, where numeric data indicating both a level of strain (e.g., at nodes of a computational mesh applied to a structural element being analyzed) and strain direction (e.g., derived from patterns within the numeric data) is generated. Aspects of structural analysis for determining strain and strain direction within a structural element are disclosed in U.S. Pat. Nos. 7,447,614 and 8,612,186, which are incorporated herein in their entirety by reference.

In preferred embodiments, the face F of the support member 115 is a planar surface and the planar surface is defined by a solid body of material. The planar surface may be that of a plurality of discrete pieces of material that are permanently attached to each other (e.g., via welding) or may be that of a single piece of material. In one or more embodiments, the generalized strain direction of each strain field region R extends one of approximately parallel to the centerline vertical reference axis V that lays within the planar surface of the support member (i.e., SD1), approximately perpendicular to the vertical reference axis V (i.e., SD2) and at an acute angle relative to the vertical reference axis V (i.e., SD3' or SD3"). The fiber optic strain gauges 125 are preferably positioned in a mirror image arrangement relative to the centerline vertical reference axis V.

As discussed above, all or a portion of the optical fiber strain gauges may be located within a water-filled containment space (e.g., tip tank) of a buoyancy tank (e.g., a pontoon). It is preferred, if not required, for an optical cable extending from the water-filled containment space to an adjacent dry space within the buoyancy tank to not enable water from within the water-filled containment space to flow into the adjacent dry space. For example, an optical fiber cable may extend through a water-tight separating wall (e.g., bulkhead) between the water-filled containment space and the adjacent dry space in the case (e.g., via a Brattberg penetration arrangement) in the case where a support member within the water-filled containment space is instrumented with fiber optic strain gauges.

Figure 6:
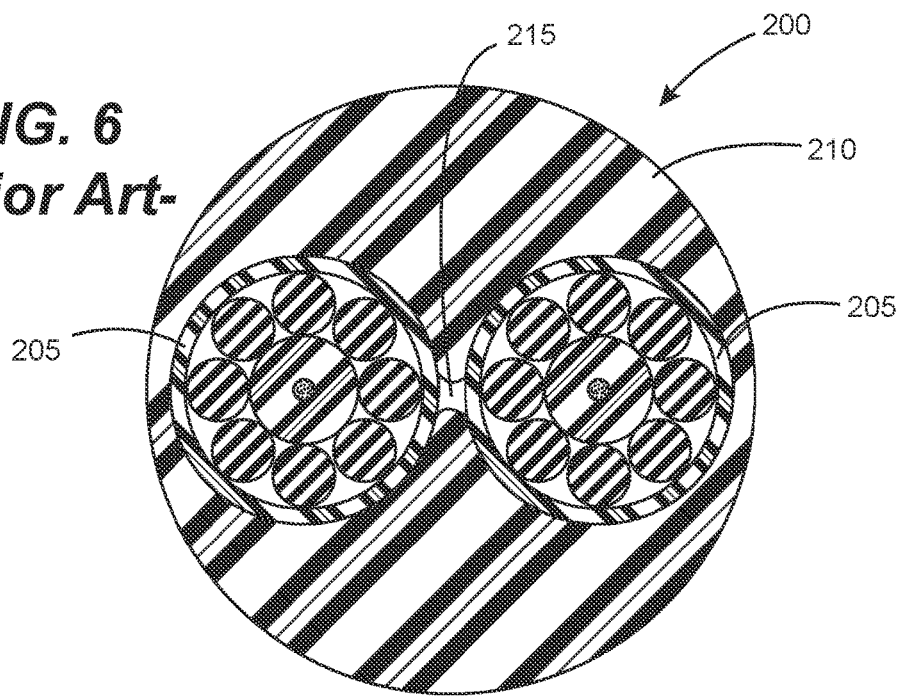
FIG. 6 is a cross-sectional view of a prior art dual core fiber optic cable.

Referring to FIG. 6, the inventor discovered that water may flow internally along a length of a multi-fiber optical cable 200 due to a space between spaced-apart optical fibers 205 of the cable 200 being inadequately (e.g., incompletely) filled by a polymeric material from which an over-molded outer jacket 210 of the cable 205 is formed. Specifically, a fluid flow passage 215 is sometimes formed between the spaced-apart optical fibers 205 within the over-molded outer jacket 210. Although this fluid flow passage 215 may be minute in overall cross-sectional size and have non-uniform shape, head pressure of the water in the water-filled containment space may be sufficient to cause water within water-filled containment space to flow into the fluid flow passage 215 via an exposed end portion of the outer jacket 210 that is located within the water-filled containment space and flow out of the fluid flow passage 215 into the adjacent dry space via an exposed end portion of the outer jacket 210 that is located within the adjacent dry space on the opposing side of the water-tight separating wall.

Figure 7:
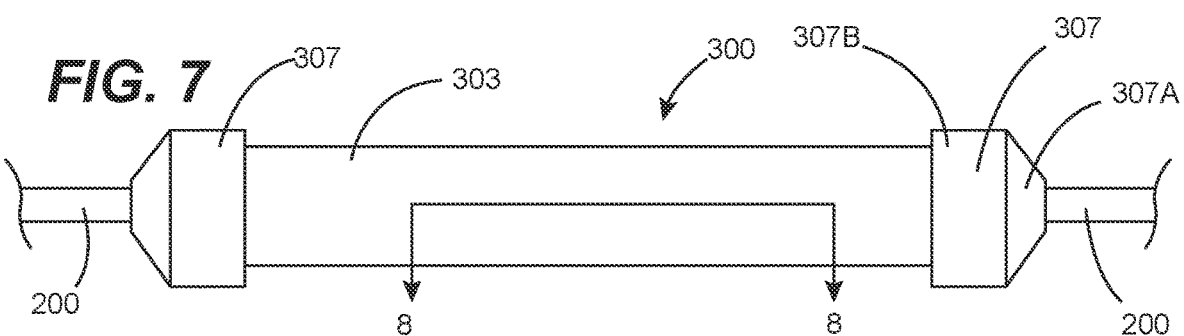
FIG. 7 is a plan view of an isolation device configured in accordance with one or more embodiments of the disclosures made herein.
Figure 8:
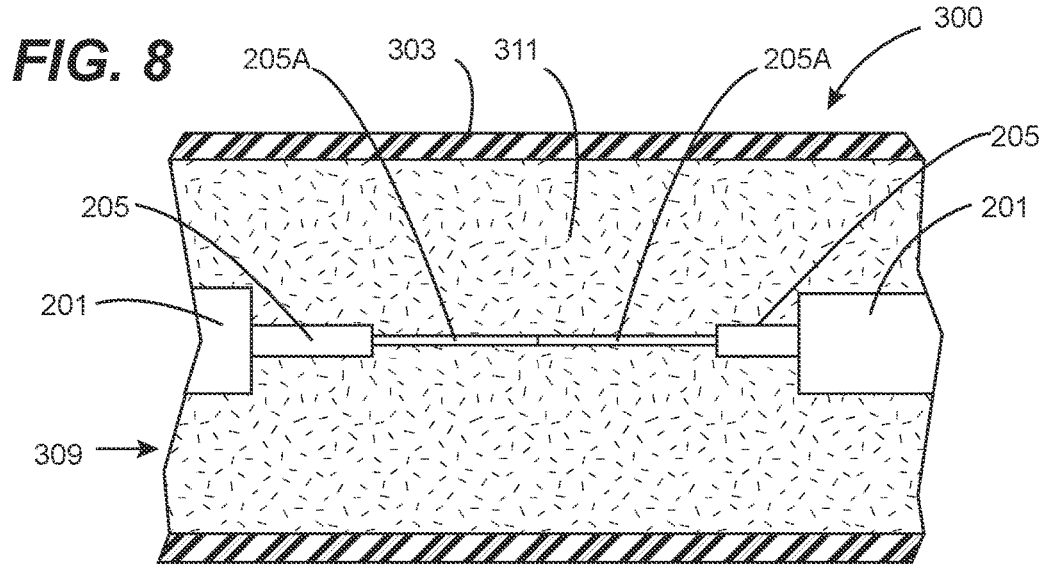
FIG. 8 is a cross-sectional view taken along the line 8-8 in FIG. 7.

As a solution to this unacceptable problem, the inventor devised an isolation device 300, shown in FIGS. 7 and 8, to inhibit this undesirable fluid flow consideration. The isolation device 300 includes main body 303 and opposing end caps 307. The main body 303, which may be in the form of a hollow body (e.g., a tube that may be cylindrically shaped), is at least long enough to contain therein all fibers of a fusion splice of one or more fibers of optical fiber cables 200 at the fusion splice location thereof and the end portions 201 of to-be-adjoined pieces of the optical fiber cables 200. Each of the end caps 307 has a first end portion 307A and a second end portion 307B that jointly define a central passage of a respective one of the end caps 307 through which an end portion 201 of a respective one of the to-be-adjoined pieces of the optical fiber cables 200 may pass. The first end portion 307A of each end cap 307 is configured for providing a water-tight circumferential seal around respective piece of the cable 200—e.g., via an integral or discrete resilient sealing member. The second end portion 307B of each end cap 307 is suitably configured for providing a water-tight seal with the interior and/or exterior surface of the main body 303—e.g., in a similar or different manner as the first end portion 307A.

In use, where the cable 200 is being used in the aforementioned pass-through application between a tip tank and adjacent dry space of a buoyancy tank (i.e., an egress cable), the isolation device 300 is utilized in combination with an inline fusion operation performed on the one or more optical fibers 205 of the to-be-adjoined pieces of the cable 200. Prior to the fusion splice operation, the main body 303, with a first one of the end caps 307 engaged therewith, is placed over the end portion 201 of a first one of the to-be-adjoined pieces of the cable 200 (end-capped end first) and a second one of the end caps 307 is placed over the end portion 201 of a second one of the to-be-adjoined pieces of the cable 200. Next, the one of more optical fibers 205 of the first and second to-be-adjoined pieces of the cable 200 are subjected to a fusion splice operation for adjoining mating glass cores 205A of the optical fibers 205 of the first and second to-be-adjoined pieces of the cable 200. The main body 303 (with the first one of the end caps 307 attached) is then positioned such that the fusion splices and end portions 201 of the to-be-adjoined pieces of the cable 200 are within a central passage 309 of the main body 303. The main body 303 is then oriented vertically with the attached end cap 307 firmly engaged and the other endcap positioned to allow access to the central passage 309 of the main body 303 through the upper end of the main body 303. A sealing material 311 is then deposited through the upper end of the main body 303 to fill the central passage 309 of the main body 303 and associated volume of the attached end cap 307 (i.e., an internal sealing material). Subsequently, the end cap 307 adjacent to the upper end of the main body 303 is moved into secure engagement with the adjacent end of the main body 303. A volume of the end cap 307 that is engaged with the upper end of the main body 303 may be filled with a suitable volume of the sealing material 311 such as, for example, through a small hole therein. The entire apparatus is held in place where the polyurethane is allowed to cure. The isolation device 300 may be covered with a suitable sealing material (i.e., external sealing material) for further protection to water ingress.

The isolation device 300 is not limited to particular sealing materials. Preferred internal sealing materials will bond to the sheath 210 of the optical fiber cables 200 and to the glass cores 205A of the optical fibers 205 and any polymeric coating on the glass cores 205A. Preferred external sealing materials will bond to the sheath 210 of the optical fiber cables 200 and to main body 303. Two-part liquid polyurethane is an example of a preferred internal sealing material. Polysulfide is an example of a preferred external sealing material. From the disclosures made herein, a skilled person will identify other suitable sealing materials.

The previous descriptions of the disclosed embodiments is provided to enable any person skilled in the art to make or use the inventive subject matter. Various modifications to these embodiments will be readily apparent to those skilled in the art, and the generic principles defined herein can be applied to other embodiments without departing from the spirit or scope of the inventive subject matter. Thus, the inventive subject matter is not intended to be limited to the embodiments shown herein but is to be accorded the widest scope consistent with the principles and novel features disclosed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A method of enabling instrumentation of a tendon leg platform (TLP) to enable monitoring of structural loadings exerted within tendon legs mooring the TLP to a seabed, comprising:
   obtaining strain gauge placement information for fiber optic strain gauges being attached to a support member that is within an interior space of a buoyancy tank of the TLP, wherein the strain gauge placement information is at least partially a function of a strain field profile resulting from loadings exerted on the buoyancy tank by one or more of the tendon legs attached thereto; and
   attaching a plurality of fiber optic strain gauges to a respective surface of the support member in accordance with the strain gauge placement information.

2. The method of claim 1 wherein the support member is one of a webframe and a bulkhead.

3. The method of claim 1 wherein the support member is a webframe located adjacent to a tip tank of the buoyancy tank.

4. The method of claim 1 wherein the placement information includes a location of the support member at which each of the fiber optic strain gauges is to be attached to the support member of the buoyancy tank and an angular orientation of a sensing axis thereof relative to an angular orientation reference axis.

5. The method of claim 1 wherein the placement information specifies a planar surface of the support member to which all of the fiber optic strain gauges are attached.

6. The method of claim 1 wherein:
   the strain field profile identifies a plurality of strain field regions each exhibiting strain in a respective generalized direction relative to a vertical reference axis laying within a planar surface of the support member; and
   the placement information specifies a respective one of the strain field regions within which each of the fiber optic strain gauges is to be attached to the respective surface with the sensing axis thereof at least approximately aligned with the respective generalized strain direction thereof.

7. The method of claim 1 wherein:
   the placement information specifies a planar surface of the support member to which all of the fiber optic strain gauges are attached;
   a vertical reference axis lies within the planar surface;
   each fiber optic strain gauge of a first portion of the plurality has the sensing axis thereof extending approximately parallel to the vertical reference axis;
   each fiber optic strain gauge of a second portion of the plurality different than the first portion has the sensing axis thereof extending approximately perpendicular to the vertical reference axis; and
   each fiber optic strain gauge of a third portion of the plurality different than the first and second portions has the sensing axis thereof extending at an acute angle relative to the vertical reference axis.

8. The method of claim 7 wherein the support member is one of a webframe and a bulkhead.

9. The method of claim 7 wherein the support member is a webframe located adjacent to a tip tank of the buoyancy tank.

10. An offshore platform, comprising:
    a hull having a central buoyancy body and a plurality buoyancy tanks attached to a lower portion of the central buoyancy body, wherein each of the buoyancy tanks has a plurality of support members within an interior space thereof wherein each buoyancy tank extends outwardly from the central buoyancy body, wherein each of the support members extends between and is fixedly attached to opposing wall portions of a respective one of the buoyancy tanks and wherein each of the opposing wall portions defines a respective exterior surface of the respective one of the buoyancy tanks; and
    a set of fiber optic strain gauges, wherein each fiber optic strain gauge of the set is attached to a surface of a respective one of the support members of a respective one of the buoyancy tanks and wherein each fiber optic strain gauge of the set is attached in accordance with strain gauge placement information derived from a strain field profile within the respective one of the support members, wherein the strain field profile is a function of loadings simulating mooring forces exerted on the respective one of the buoyancy tanks by one or more tendon legs attached thereto.

11. The offshore platform of claim 10 wherein each of the support members is one of a webframe and a bulkhead.

12. The offshore platform of claim 10 wherein each of the support members is a webframe located adjacent to a tip tank of the buoyancy tank.

13. The offshore platform of claim 12 wherein:
each fiber optic strain gauges of the set is attached to a planar surface of the respective one of the support members of the respective of the buoyancy tanks within a respective one of a plurality of strain field regions thereof with a sensing axis of the repsective one of the fiber optic strain gauges at least approximately aligned with a respective generalized strain direction the respective one of a plurality of strain field regions.

14. The offshore platform of claim 12 wherein:
each fiber optic strain gauge of a first portion of the set has a sensing axis thereof extending approximately parallel to a vertical reference axis;
each fiber optic strain gauge of a second portion of the set different than the first portion thereof has a sensing axis thereof extending approximately perpendicular to the vertical reference axis; and
each fiber optic strain gauge of a third portion of the set different than the first and second portions thereof has a sensing axis thereof extending at an acute angle relative to the vertical reference axis.

15. The offshore platform of claim 10 wherein:
each fiber optic strain gauge of a first portion of the set has a sensing axis thereof extending approximately parallel to a vertical reference axis;
each fiber optic strain gauge of a second portion of the set different than the first portion thereof has a sensing axis thereof extending approximately perpendicular to the vertical reference axis; and
each fiber optic strain gauge of a third portion of the set different than the first and second portions thereof has a sensing axis thereof extending at an acute angle relative to the vertical reference axis.

16. The offshore platform of claim 10 wherein:
each fiber optic strain gauge of the set is positioned at a location of the respective one of the support members of the respective one of the buoyancy tanks in accordance with the strain field profile within the respective one of the support members; and
the placement information includes the location of respective one of the support members at which each of the fiber optic strain gauges is to be attached thereto and an angular orientation of a sensing axis thereof relative to an angular orientation reference axis.

17. The offshore platform of claim 10 wherein each of the fiber optic strain gauges is attached to a planar surface of the respective one of the support members of the respective one of the buoyancy tanks within a respective one of a plurality of strain field regions thereof with a sensing axis thereof at least approximately aligned with a respective generalized strain direction thereof.

* * * * *